Figure 1:
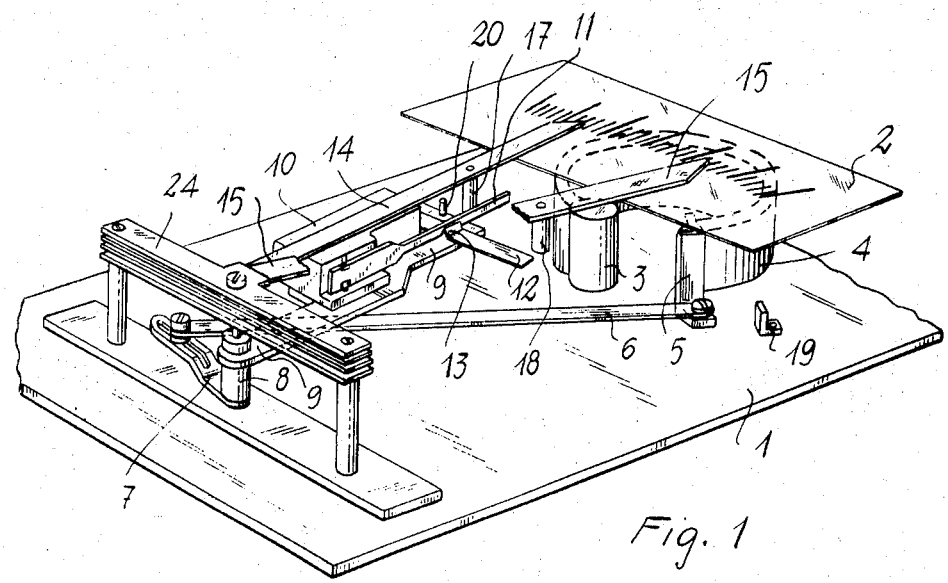

United States Patent [19]

Brauer

[11] 3,825,704

[45] July 23, 1974

[54] MICROSWITCH DEVICE ACTUATABLE AT TWO PRESET VALUES OF A MEASURABLE VARIABLE

[75] Inventor: Gualtiero Brauer, Milan, Italy

[73] Assignee: Facem Fabbrica Apparecchi Controllo e Misura di Gualtiero Brauer, Milano, Italy

[22] Filed: Mar. 29, 1973

[21] Appl. No.: 345,898

[30] Foreign Application Priority Data

Apr. 11, 1972 Italy .................................. 23008/72

[52] U.S. Cl. ............ 200/56 R, 200/81.8, 200/153 T
[51] Int. Cl. ............................................. G01d 13/26
[58] Field of Search ........ 200/47, 56 R, 56 A, 81.8, 200/153 T; 73/411–418

[56] References Cited
UNITED STATES PATENTS

| | | | |
|---|---|---|---|
| 2,175,085 | 10/1939 | Lothrop ...................... | 200/56 A X |
| 2,384,345 | 9/1945 | Schellentrager .................. | 200/56 R |
| 2,846,531 | 8/1958 | Baker............................. | 200/56 R |
| 3,182,146 | 5/1965 | Levpold ...................... | 200/153 T X |
| 3,352,987 | 11/1967 | Machado et al. ........... | 200/153 T X |
| 3,533,294 | 10/1970 | Fahy .................................. | 73/411 |
| 3,678,758 | 7/1972 | Lawrence ...................... | 200/81.8 X |

*Primary Examiner*—James R. Scott

[57] ABSTRACT

Device for regulating between a maximum and a minimum the value for a variable, such as a pressure or a temperature. The device comprises an element moving as the controlled variable value changes and moving through a kinematic motion a microswitch having an operating lever extending between two manually movable pointers and defining the maximum and minimum values for the variable.

7 Claims, 2 Drawing Figures

PATENTED JUL 23 1974    3,825,704

MICROSWITCH DEVICE ACTUATABLE AT TWO PRESET VALUES OF A MEASURABLE VARIABLE

This invention relates to a microswitch device responsive to a variable, valve shifting out of two presettable limits.

As known, in industrial processes there often exists the requirement of regulating a variable, such as a pressure, pressure difference, temperature, temperature difference, fluid flow rate, fluid level, etc., through a device capable of interrupting or restoring the closure of one or more electrical contacts connected to one or more utilizing circuits.

There are known devices providing for regulating said variable by static force balancing systems and having contacts comprising mercury-drop oscillating bulbs: these devices suffer from a number of disadvantages restricting a wide use thereof, such as poor accuracy, somewhat complicated structure, as well as complicated lever systems and relatively high control forces.

It is an object of the present invention to provide a device for regulating the value for a variable in an industrial process by a kinematic system of a substantial structural simplicity, a device which is of a high accuracy, that is readily applicable for controlling any of the plurality of different industrial variables.

Another object of the invention is to provide a device wherein the electrical contacts can be operated by control forces of a substantially reduced value, a device which is also suitable for varying the values in interrupting and restoring the contact or contacts, by adjustment thereof at any location of the measuring field, up to the limit as formed by the two ends of the field.

These and further objects are accomplished by a device responsive to a variable value shifting out of two presettable limits, the device being characterized by comprising at least one element moving as the value of a controlled variable changes, a kinematic arrangement connecting said element with a spindle rotable about its axis, a major arm carried by said spindle and carrying in turn a microswitch having an operating lever rockable through a wide angle, a flexible blade fast with the major arm and resiliently pressing down on said lever, the blade extending transversely thereto, two pointers freely rotable on a pin coaxial with said spindle, a dial scaled for the units of the variable to be controlled and in front of which the free ends are arranged for said pointers, wires connecting the microswitch to at least one utilizing circuit, a tip presented by said flexible blade which when passed over by said lever causes the operation of the microswitch, and a peg projecting from each of said two pointers, said lever extending between said pegs and interferring therewith when the specified variable value shifts out of the limits as set by said pointers.

Figure 2:
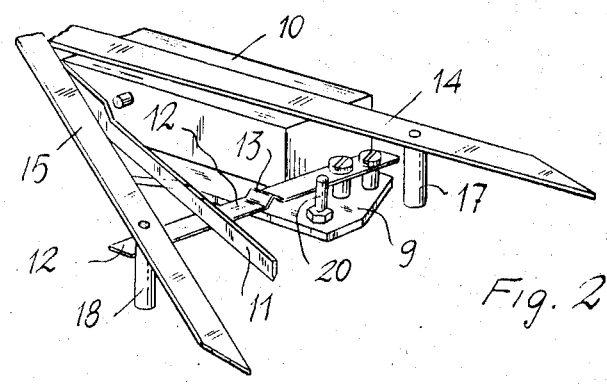

For a better understanding of the device structure and features, an embodiment thereof will now be described by mere way of not limiting example, reference being had to the accompanying drawing in which:

FIG. 1 is a fragmentary perspective view showing the device according to the invention; and FIG. 2 is a perspective view showing a detail from a different angle of sight.

The device comprises a rigid casing including a base plate 1 and a dial 2 scaled for the units of the variable to be controlled, that is scaled in kg/sq.cm. for the case herein shown and described.

The hollow hub 3 of a Bourdon spring 4, that is an internally hollow spiral spring, to the inside of which a pressure fluid can be supplied, is fast with said plate 1.

To the free end 5 of spring 4, or that end moving relatively to plate 1 as the pressure varies in the fluid supplied to the interior of the spring cavity, there is attached through a screw one end of a rigid rod 6, the other end of which is restrained to a lever 7 by means of a screw secured in an adjusting groove of said lever 7 (FIG. 1).

A spindle 8 is rotably attached to lever 7 and freely rotable about its axis at right angles to the surface of plate 1, this spindle having fast therewith a major arm 9 on which a microswitch 10 is secured and has a somewhat elongated operating lever capable of oscillating through a wide angle between two limit positions: the lower edge of lever 11, that is the edge facing said plate 1, is sharp, that is thinned to form a very thin cutting edge.

Preferably, even though not, necessary, the connection among lever 7, spindle 8 and arm 9 is not a rigid connection, but may be effected by the interposition of a spring, for simplicity not shown in the drawing, which resiliently yields when said arm 9, even if the torsional movement transmitted to the spindle 8 by rod 6 exceeds such maximum values as hazardous for the device strength.

One end of a flexible blade 12 is fast with the major arm 9 and extends transversely of the lever 11 and presses resiliently against the lower edge of the lever. At an intermediate location said flexible blade 12 has a section thereof shaped as a tip 13, said tip being positioned so that, when the lever 11 is on one side thereof or on the other side respectively, the contact or contacts of the microswitch 10 are closed or opened, respectively. It should be noted that, because of the cutting edge shape of lever 11 and the tip shape 13 of blade 12, lever 11 will releasingly pass from one side to another of the tip, and vice versa, thereby releasingly operate the microswitch as soon as said lever is moved on said tip.

On a rigid cross member 24 fast with the plate, provision is made for a pin coaxial with the spindle 8, but independent thereof, on which pin are rotably mounted an end of two movable pointers 14 and 15, respectively, from which a rigid peg 17 and 18, respectively, downwardly protrude. Said two pegs 17 and 18 are so positioned that the operating lever 11 of the microswitch 10 extends therebetween and can freely ocillate only therebetween.

Finally, it will be appreciated that a stop element 19 is fast with plate 1 and intended to bear the thrust possibly transmitted thereto by said Bourdon spring when the pressure exceeds a predetermined maximum value, while said major arm 9 is integral with a stop peg 20, on which said lever 11 can abut.

Assume now to be under rest or inoperative conditions and pointers 14 and 15 are manually set to a position where pointer 14 is indicating a minimum pressure and pointer 15 is indicating a maximum pressure. Between these two preselected pressures, the checked industrial variable value, that is the pressure value in the example shown on the drawing, should be capable of freely oscillating, but said microswitch has to be driven to overrun said limits.

Assume then that the microswitch is also under rest or inoperative conditions, such as at the position shown in FIG. 2. When a fluid under increasing pressure is supplied to the sensitive element, that is spring 4, the end 5 of spring 4 will be moved, thereby causing the rotation through rod 6 and lever 7 for the spindle 8 which, in turn, rotably drives the major arm 9 in a clockwise direction and therewith the flexible blade 12 and the operating lever 11 for the microswitch 10, while the pointers 14 and 15 are kept stationary at the preset position.

As the pressure continues to increase and hence the clockwise rotation of arm 9, at some time said lever 11 will come to contact the maximum limit peg 18 stopping there against. Clockwise rotation will instead continue for arm 9 and blade 12, the latter sliding against the lower edge of lever 11 until the tip 13 is below said lever 11 and releasingly passed by the lever, thus operating the microswitch. Any further increase in pressure and hence any further clockwise movement of the major arm 9 would not have any other effect on the microswitch 10, since the lever 11 would continue to slide on blade 12 until contacting the stop peg 20 serving the purpose of protecting the lever integrity in case of undue increase in pressure beyond full-scale.

Under these conditions, the tip 13 would be located on the right of lever 11, as shown in FIG. 1.

Assume now that from the maximum value attained, the variable, that is the checked pressure, will start to drop its value, whereby the major arm 9 would start to rotate in anticlockwise direction moving said lever 11 away from the maximum limit peg 18, but without said lever passing or being allowed to pass over the tip 13, and thus without the microswitch being operated again. The anticlockwise movement of the major arm 9 along with said blade 12 and lever 11 will continue unaltered until lever 11 comes into contact with the minimum limit peg 17 fast with pointer 14 which, after stopping the movement of lever 11 and possibly caused it to slide for a short distance over blade 12, will bring it back on tip 13 which is releasingly passed, while the microswitch 10 is correspondingly releasingly operated.

Preferably, a rigid pointer is fast with the major arm 9 and also extends above the scaled dial 2 and allows for instantaneously singling out the variable value being checked, this pointer not being shown in the drawings for simplicity.

It is apparent that the variable, the value of which is controlled by the described device, can be other than a pressure, or it is apparent that said Bourdon spring 4 can be replaced by a plane thermometrical spiral spring, or generally by a spindle rotating through a determined angle proportional to the positive and negative increments in the variable, the rotations of said spindle corresponding thereto.

It is important to note that the device operation occurs by means of a microswitch 10 which can be of the mechanical release or magnetic release type and requires very small control forces and rather simple operating lever systems.

The tip-shaped section 13 of the flexible blade 12 causes the lever 11 to releasingly operate the microswitch and to retain the last position provided by means of the maximum or minimum limit peg until the occurrence of an opposite pulse to change the state thereof, that is until the lever is moved by interferring with the minimum or maximum limit peg, respectively. By wires, not shown on the drawing, the microswitch 10 is connected to a utilizing circuit which is to be controlled in accordance with the change in the checked variable value.

Since the pointers 14 and 15 can take any position throughout the measuring range allowed by the meter, the interruption or restore values for the microswitch contact or contacts can be adjusted at any location of the measuring range, up to the limit comprising the two ends of the range.

As the device is made of kinematic members, its structure is rather simple and allows a high accuracy and a high applicability to control the most different industrial variables.

I claim:

1. A microswitch device actuatable at two preset values of a measurable variable comprising:

a base;

a measuring element having a first portion coupled to said base and a second portion movable in response to changes in the value of said measureable variable;

a connecting member having one end connected to said second portion;

a spindle assembly rotatably coupled to said base and projecting from said base, said spindle having a connecting lever arm coupled to another end of said connecting member, and having a major arm projecting transversely to the axis of said spindle and rotatable with said spindle;

a microswitch mounted on said major arm, said microswitch having an operating lever rockable through an angle;

a flexible blade attached to said major arm and moveable with said major arm, said blade extending transversely to said operating arm and generally parallel to the plane in which said operating lever is rockable, said blade being biased against said operating lever and having a tip on that surface of said blade which is biased against said operating lever to provide a change in sliding resistance between said blade and said operating lever at a position along the length of said blade corresponding to the position at which said operating lever actuates said microswitch;

two pointers rotatable about a pin coaxial with said spindle assembly, each pointer having a peg projecting into the path through which said operating lever is rockable, said pegs straddling said operating lever, whereby movement of said operating lever by said measuring element, acting through said spindle, is stopped when said operating lever abuts either of said pegs, said micro switch and said blade continuing to move in response to said measuring element thus causing said lever to actuate said microswitch as said tip slides past said operating lever.

2. A microswitch device as claimed in claim 1, including a scale located adjacent the free ends of said pointers and coupled to said base.

3. A device as claimed in claim 1, including a stop peg mounted on said major arm in the path through which said operating lever is rockable, thus limiting said angle.

4. A device as claimed in claim 1, including a pointer projecting from said major arm to said scale, whereby the position of said major arm is indicated with respect to said scale.

5. A device as claimed in claim 1, wherein said spindle assembly is resilient.

6. A device as claimed in claim 1, wherein the surface of said operating lever bearing on said flexible blade comprises a sharp edge.

7. A switch device actuatable at two preset values of a measurable variable, comprising:

measuring means moveable in response to changes in said variable;

switch means coupled to said measuring means and moveable in response to movement of said measuring means, said switch means including a switch and an operating lever moveable through a path to actuate said switch;

a pair of stops adjustably positionable in said path bestride said operating lever; and restraining means coupled to said measuring means and moveable with said switch means, said restraining means coupled to said operating lever for restraining the movement of said operating lever through said path, said restraining means having a restraining discontinuity at a position along said path where said operating lever actuates said switch, whereby movement of said operating lever through said path is stopped when said operating lever abuts either of said stops, said switch and said restraining means continuing to move in response to said movement of said measuring means thereby causing said operating lever to actuate said switch as said discontinuity moves past said operating lever.

* * * * *